Nov. 11, 1952  E. KNAUSS  2,617,687
HOSE NOZZLE
Filed July 8, 1949
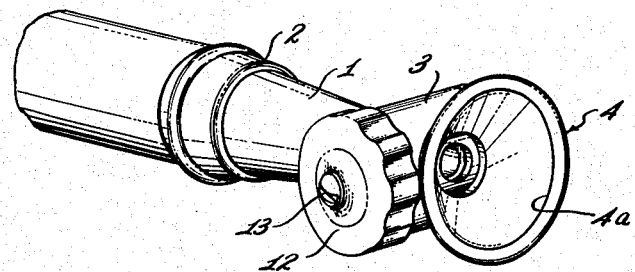
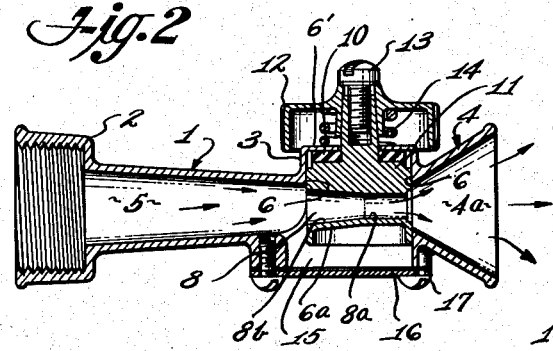
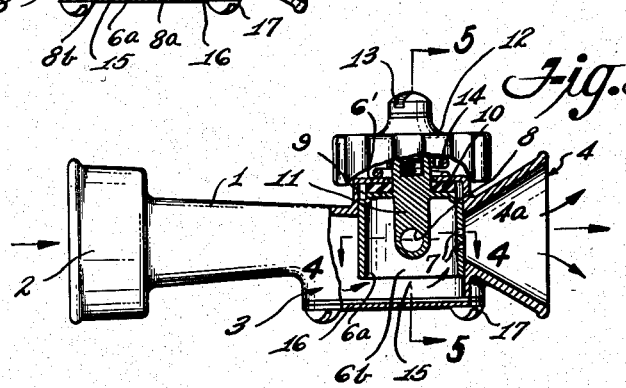
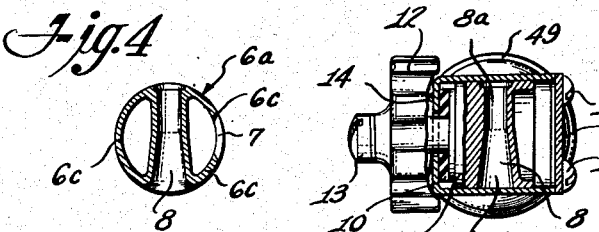
INVENTOR.
EDWARD KNAUSS
BY
*Luther L. Mack*
Attorney Patented Nov. 11, 1952

2,617,687

UNITED STATES PATENT OFFICE 2,617,687

HOSE NOZZLE

Edward Knauss, North Hollywood, Calif., assignor to Elkay, Inc., Los Angeles, Calif., a corporation of California Application July 8, 1949, Serial No. 103,550

7 Claims. (Cl. 299—138)

This invention relates to and has for an object the provision of a simple and efficient hose nozzle embodying a rotary valve disposed near the discharge end of the nozzle on an axis at right angles to that of the nozzle and having characteristics which combine with certain features on the body of the nozzle to substantially improve the flow, range and distribution of water over an area beyond the possibilities of other conventional types of nozzles.

To such end, and more particularly, my improvements comprehend the provision of a body attachable conventionally at its rear end to a hose, an axial passage leading therefrom to the discharge head at the front, a conoidal outlet adapted to communicate with said passage indirectly through an off-set chamber and thence through the valve for regulating the velocity, spread and distribution of the water discharge through the outlet under control of said valve.

Another object is to so form the nozzle body that the velocity of flow therethrough will increase toward the outlet and to so form and mount the valve that the velocity of flow therethrough and the jet or spray may be varied at will by but slight adjustment of the valve to obtain a maximum of effective distance, spread and distribution of water over a desired area.

A further object is to provide a readily accessible unit without usually attendant parts and complications and including a valve with a range of adjustment of less than one complete revolution to selectively provide all possible characteristics to the emitted water to meet varying conditions of use.

Other objects may appear as the description of my invention progresses.

I have shown a preferred form of device embodying my improvements in the accompanying drawing in which:

Fig. 1 is a perspective view of an assembled nozzle;

Fig. 2 is a longitudinal sectional view showing the valve in one position;

Fig. 3 is a side view partly in section showing the valve in another position;

Fig. 4 is a sectional view of the valve on line 4—4 of Fig. 2;

Fig. 5 is a sectional view on line 5—5 of Fig. 3.

As shown, my faucet includes a body 1 with an internally threaded socket 2 at its rear end adapted to receive a conventional ferrule of a section of hose, a cylindrical head 3 forwardly of the body, and a conoidal outlet 4. Body 1 has a tapered passage 5 leading from socket 2 to a cylindrical valve chamber 6 within head 3 and outlet 4 has an outwardly flaring outlet passage 4a with its smaller inner end in communication with a cylindrical valve 6a through one or more spaced or pairs of straight slots 7, 7, or a central passage 8.

It will be noted that valve 6a and head 3 are disposed on an axis at right angles to that of body 1 and that the upper portion of valve chamber 6 is closed by a wall 6′ between which and the end 9 of valve 6a, a gasket 10 is held on valve stem 11.

A fluted operating wheel 12 is fixed to stem 11 by means of a screw 13 for the purpose of rotatably adjusting valve 6a in its seat 6 relative to outlet 4a. A spring 14 is compressed between wheel 12 and head 3 and serves to urge the valve and gasket upwardly into sealing engagement with wall 8 of valve cylinder 6.

As shown in Figs. 2, 3 and 5, the head 3 is formed with an offset chamber 15 opposite and communicating with the internal chamber 6b of valve 6a and with passage 5 of body 1 which is closed by a plate 16 secured to head 3 as by screws 17. Said plate is readily removable for affording access to head 3 and valve 6a and for the purpose of inserting and removing the valve. Hence, the water freely flows from passage 5 to chamber 6b for discharge through the peripheral valve orifices, as at 7, when the valve is appropriately adjusted relative to outlet 4a. Otherwise, when valve 6a is properly adjusted, water is directly transmitted from passage 5 through passage 8 of valve 6a to outlet 4a.

Gasket 10 prevents leakage of water around valve 6a and around stem 11.

The orifices 7 and 8 of valve 6a are so disposed as to provide outlet closing segments 6c, 6c, etc., between the openings of passage 8 and orifices 7, as shown in Fig. 4, so that when the valve is adjusted with one of said segments opposite outlet 4a, the outlet may be either wholly or partly closed against discharge of water from the nozzle. In some cases, the extent of a segment 6c may be less than the circumferential distance between an orifice 7 and an opening of passage 8, in which case a partial merger of an axial jet from passage 8 and jets of flat cross section from orificial slots 7 are effected and serve to diffuse and distribute the water over an area in a manner not possible by usual axially arranged nozzle valves.

It is important to note that the water discharged indirectly from passage 5 through valve chamber 6b and orifices 7 is deflected by plate 16 upwardly and forwardly into and from valve chamber 6b through orifices 7 and also downwardly from end 11 of the valve so that it emerges from orifices 7 at an angle and is again deflected by the conoidal wall of outlet 4, thereby causing breaking up of a stream or jet into globules and a spreading of the resultant spray over a substantially wide area at any velocity and for a substantial distance forwardly of the nozzle under maximum velocity.

When, for instance, valve 6a is adjusted with a pair of spaced orificial slots, as shown in Figs. 3 and 4, the ejected water will be in the form of two jets of flat cross section which will merge or collide at a point forwardly of the nozzle and cause a breaking up of the water into globules from such point of intersection and a consequent dropping and possible lateral spreading of water from such point throughout the remaining effective path of the merged stream.

It may be noted also that passage 8 of valve 6a has a major area at one extremity and a minor area at its other extremity which permits of the creation of minimum and maximum velocities of water at outlet 4a when the valve is adjusted with the portion 8a of minimum area rearmost or the portion of maximum area rearmost, respectively.

The essence of this invention is in the provision of body 1 arranged to increase the velocity of flow toward its outlet, the provision of the cylindrical valve seat and valve therein rotatable on axis at right angles to the axis of the body and formed with peripheral outlets capable of selective registration with the outlet of the body, means for directly and indirectly conducting water to and through the valve to produce jets, streams or sprays of varied character, means at the outlet for spreading the ejected water, and means for readily inserting and removing the valve, all considered independently, or together.

I claim:

1. A hose nozzle comprising: a body formed at one end with a hose attaching socket leading to an inlet passage and a spray nozzle at its other end, a flow passage chamber being formed in the body between said socket and said nozzle and in constant communication with said inlet passage, a tubular valve rotatably mounted on the body on an axis transversely of the axis of the body and having a chamber therein constantly open to said flow chamber, said valve having a diametrical passage adapted at times for alinement with said inlet passage to afford communication between the inlet passage and said nozzle, exclusive of said body chamber, the wall of said valve chamber having perforations for directing a liquid from said valve chamber outwardly through said nozzle when the valve is rotated so as to prevent flow through said diametrical passage, and selectively, to permit flow through the diametrical passage to the nozzle when the valve is rotated so as to close said perforations to flow of liquid.

2. A hose nozzle as characterized in claim 1 in which said body is formed with an annular seat for said valve, a stem extended through a wall of said seat and an operating member affixed to the end of said stem.

3. A hose nozzle as characterized in claim 1 in which the inlet passage connecting said socket with said flow chamber is of gradually decreasing area from the nozzle to said flow chamber, the diametrical passage in said valve being axially alined with the inlet passage of the body and also with the nozzle whereby direct flow of a liquid is effected through the body and valve to and from the nozzle upon appropriate operation of said valve.

4. A hose nozzle as characterized in claim 1 in which the inlet passage connecting said socket with said flow chamber is of gradually decreasing area from the nozzle to said flow chamber, the diametrical passage in said valve being axially alined with the inlet passage of the body and also with the nozzle whereby direct flow of a liquid is effected through the body and valve to and from the nozzle upon appropriate operation of said valve, said flow chamber having a detachable cover alined with and through which the valve may be inserted and removed when said cover is detached.

5. A hose nozzle as characterized in claim 1 in which the inlet passage connecting said socket with said flow chamber is of gradually decreasing area from the nozzle to said flow chamber, the diametrical passage in said valve being axially alined with the inlet passage of the body and also with the nozzle whereby direct flow of a liquid is effected through the body and valve to and from the nozzle upon appropriate operation of said valve, said flow chamber having a detachable cover alined with and through which the valve may be inserted and removed when said cover is detached, said cover being axially spaced from said valve to permit flow of a liquid from the inlet passage of said body through the interior of the valve and thence outwardly to the nozzle through the perforations in the wall of the valve when the valve is correspondingly operated.

6. A hose nozzle as characterized in claim 1 in which the inlet passage connecting said socket with said flow chamber is of gradually decreasing area from the nozzle to said flow chamber, the diametrical passage in said valve being axially alined with the inlet passage of the body and also with the nozzle whereby direct flow of a liquid is effected through the body and valve to and from the nozzle upon appropriate operation of said valve, said flow chamber having a detachable cover alined with and through which the valve may be inserted and removed when said cover is detached, said cover being axially spaced from said valve to permit flow of a liquid from the inlet passage of said body through the interior of the valve and thence outwardly to the nozzle through the perforations in the wall of the valve when the valve is correspondingly operated, and operating member affixed to the valve externally of the body and serving to rotate the valve and also to retain the valve in operative position.

7. A hose nozzle comprising a body formed with a hose attaching socket and a nozzle at opposite extremities having an axial inlet passage connecting said socket and said nozzle, a valve of cylindrical cross section rotatably mounted on said body adjacent said nozzle, said body having a flow chamber in which said valve is seated and in constant communication with the passage in said body, said valve having a chamber therein in constant communication at one end with said flow chamber, said valve having a diametrical passage adapted when the valve is appropriately adjusted to be alined with said nozzle and said socket to permit direct flow from the body through said inlet passage to and outwardly from said nozzle exclusive of the flow chamber, the wall of said valve chamber having peripheral perforations arranged to permit flow of water from the flow chamber and the valve chamber into and from said nozzle exclusive of said diametrical passage when the valve is adjusted so as to close said diametrical passage.

EDWARD KNAUSS.

REFERENCES CITED

The following references are of record in the file of this patent:

UNITED STATES PATENTS

| Number | Name | Date |
| --- | --- | --- |
| 511,728 | Deming | Dec. 26, 1893 |
| 582,345 | Decarie | May 11, 1897 |
| 676,526 | Anderson | June 18, 1901 |
| 867,521 | Moulton | Oct. 1, 1907 |
| 1,085,120 | Gibbs | Jan. 7, 1914 |
| 1,273,685 | Smiedel | July 23, 1918 |